United States Patent [19]

Kuhn et al.

[11] Patent Number: 4,556,467
[45] Date of Patent: Dec. 3, 1985

[54] APPARATUS FOR ULTRASONIC PROCESSING OF MATERIALS

[75] Inventors: Martin C. Kuhn, Tucson, Ariz.; Vernon Zeitz, Springfield, Vt.

[73] Assignee: Mineral Separation Corporation, Tucson, Ariz.

[21] Appl. No.: 275,988

[22] Filed: Jun. 22, 1981

[51] Int. Cl.[4] .................. B01J 19/10; B02C 19/18; B08B 3/12; C22B 1/00

[52] U.S. Cl. .......................... 204/193; 134/1; 134/184; 210/748; 241/1; 366/127; 75/1 R

[58] Field of Search .................. 204/193; 134/1, 184; 75/1 R; 241/1, 301; 366/336, 341, 115, 127

[56] References Cited

U.S. PATENT DOCUMENTS 3,348,814 10/1967 Shaw .................................. 204/193
4,071,225 1/1978 Holl ................................... 366/127
4,207,154 6/1980 Lemelson ........................... 204/193

Primary Examiner—Howard S. Williams
Attorney, Agent, or Firm—Roger L. Fidler

[57] ABSTRACT

Apparatus and processes are disclosed for treating materials by exposure thereof to sonic or ultrasonic oscillations produced by oscillating plates which form part of a processing chamber and which are each activated by a plurality of transducers adjacent thereto. The transducers are excited by an electronic circuit capable of driving each transducer at selectable frequencies, phase relationships and amplitudes. The invention also comprises processes for the treatment of materials by exposure thereof to oscillating plates excited at predetermined combinations of frequencies, phases and amplitudes.

17 Claims, 13 Drawing Figures

PLATE A

PLATE B

45° PHASE DIFFERENCE

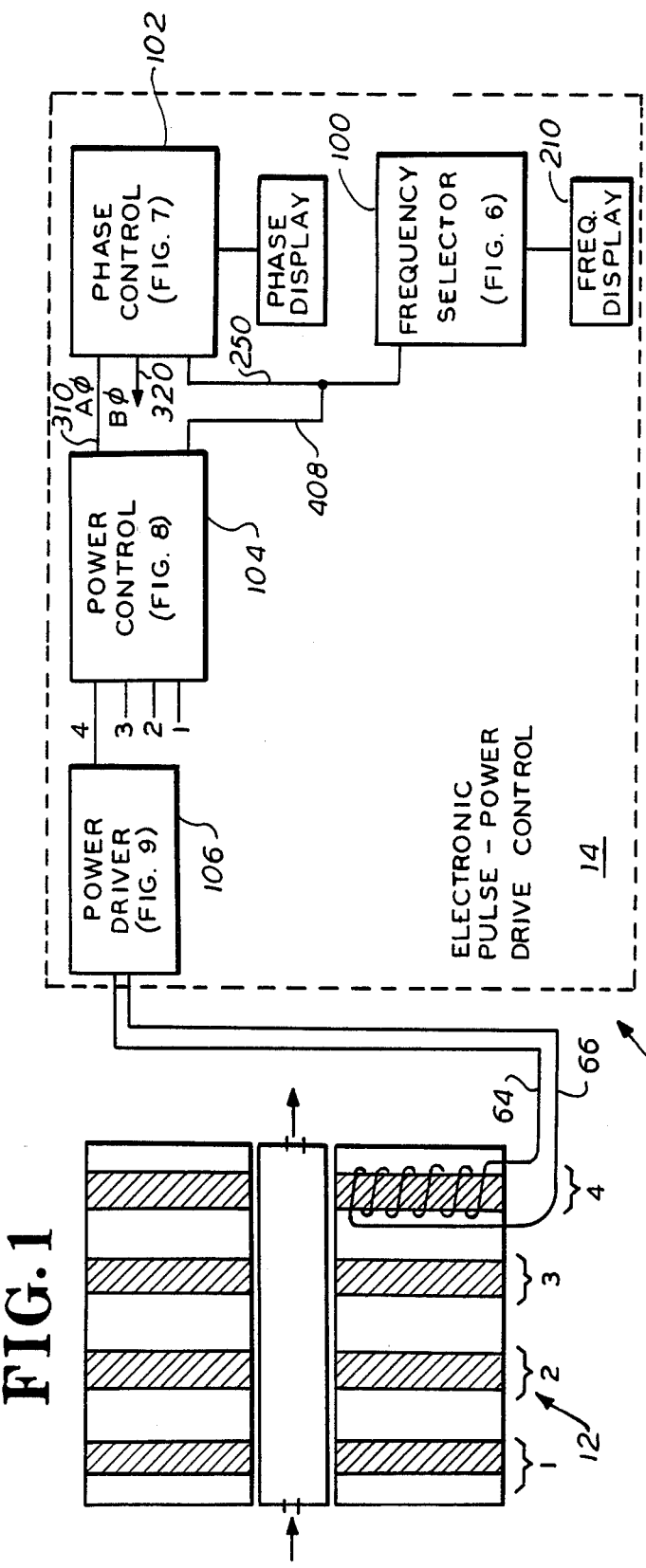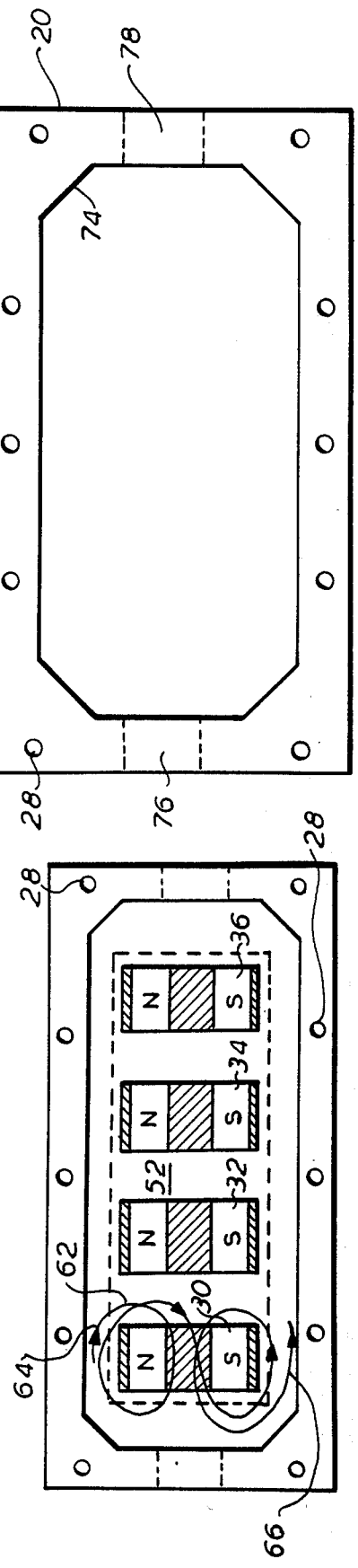

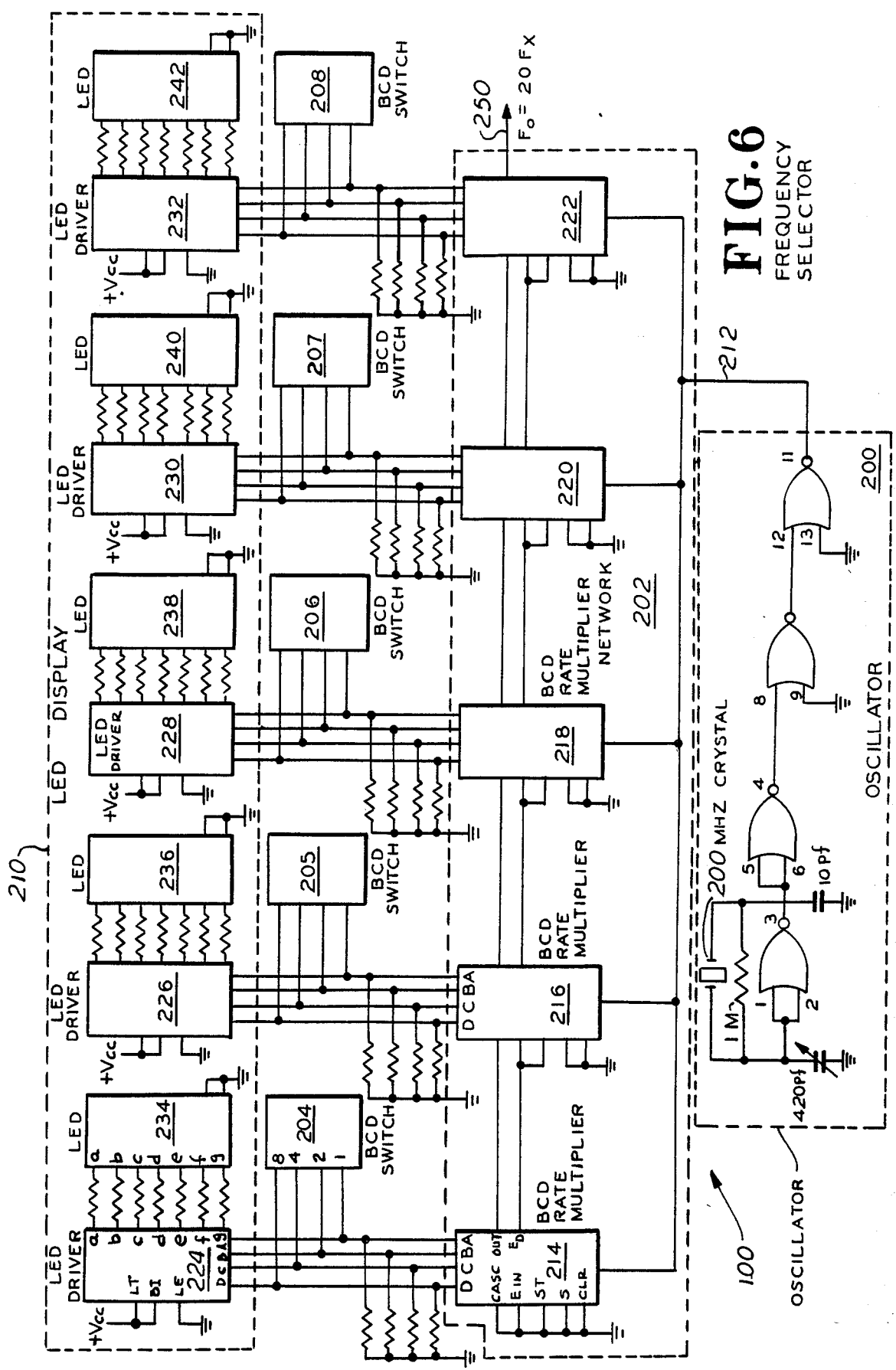
FIG. 6 FREQUENCY SELECTOR

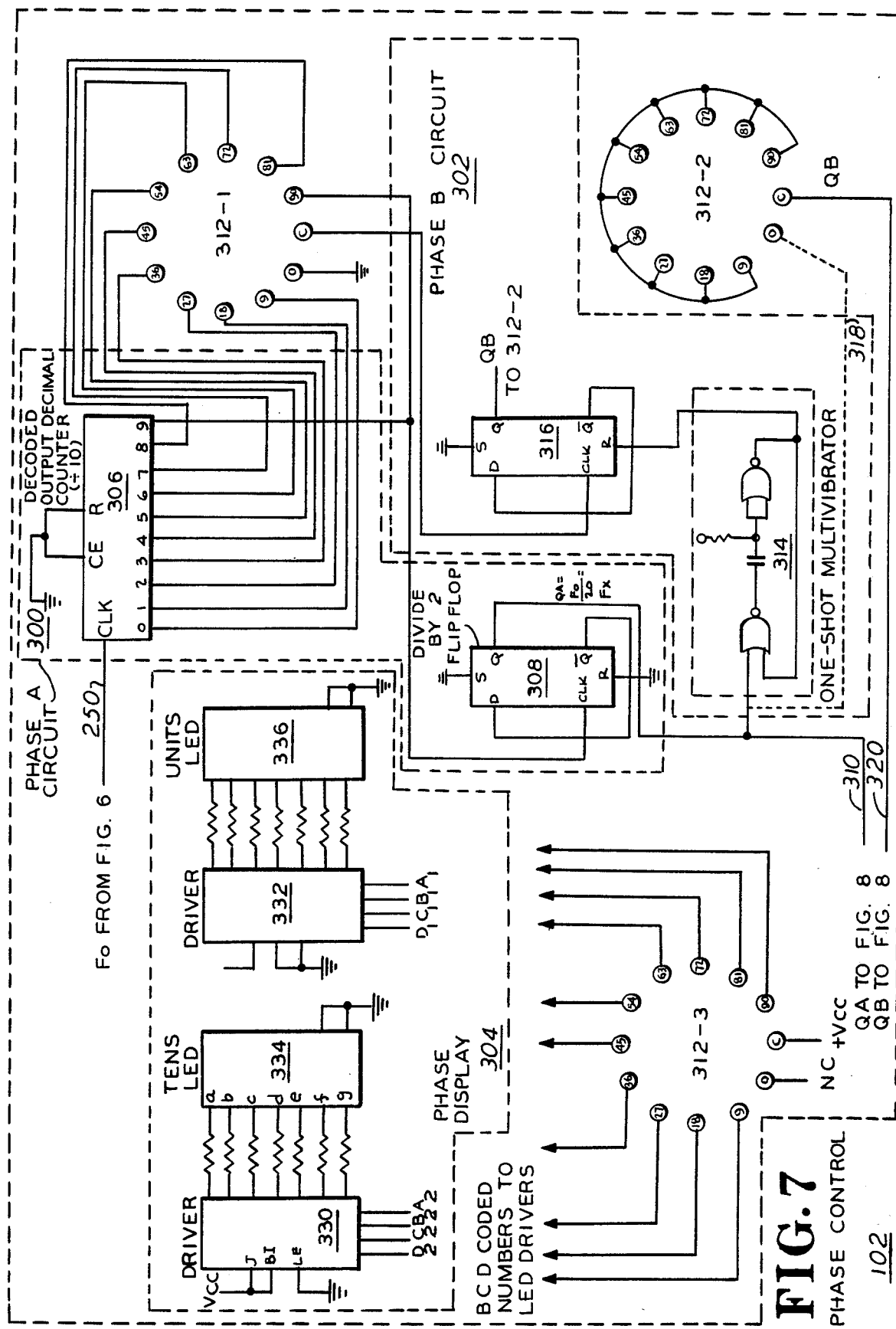
FIG. 7 PHASE CONTROL 102

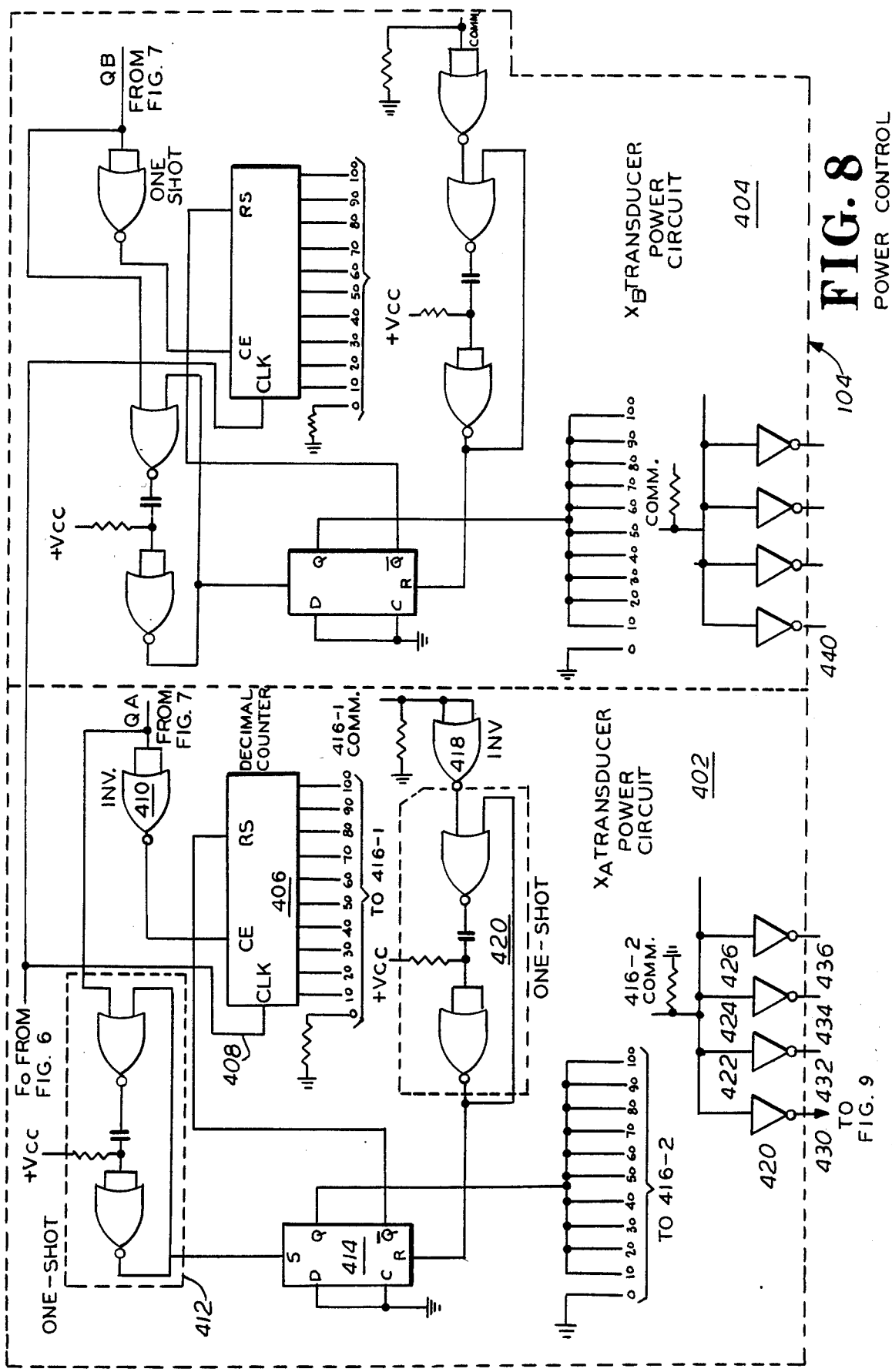
FIG. 8 POWER CONTROL

POWER DRIVER

PLATE A                                               0° PHASE DIFFERENCE

PLATE B

PLATE A                                               45° PHASE DIFFERENCE

PLATE B

PLATE A                                               90° PHASE DIFFERENCE

PLATE B

APPARATUS FOR ULTRASONIC PROCESSING OF MATERIALS

BACKGROUND OF THE INVENTION

1. Field of the Invention

The present invention relates generally to apparatus and processes for the treatment of materials. More specifically, the invention disclosed herein relates to apparatus and processes for processing materials by the exposure thereof to sonic and ultrasonic oscillations.

2. Description of the Prior Art

Sonic and ultrasonic processing devices for the treatment of materials (usually a medium in the liquid phase) are well known in the prior art. Generally, they can be characterized as either static (or batch) processors or continuous, flow-through ultrasonic processors. As will be understood by those skilled in the art, the term "ultrasonic" sometimes is used to refer to frequencies in excess of 20,000 $H_z$ and the term "sonic" sometimes refers to frequencies less than 20,000 $H_z$. However, for the purpose of the present invention it will be understood that the term "ultrasonic" will be used generally herein to refer to all frequencies. Ultrasonic processors, as that term is used herein, generally refers to devices which can produce, within a material or medium, oscillations at a predetermined frequency, which oscillations are used generally for treatment of the material by processes such as emulsification, solubilizing, cleaning, etc.

Static processors usually comprise a processing chamber for containing the material to be treated and at least one plate or transducer for being oscillated at a predetermined frequency and for oscillating said material.

Continuous, flow-through processors known in the prior art generally comprise a processing chamber through which the material to be processed flows or circulates and at least one transducer for being in contact with the processing chamber or flowing material and for being oscillated at a predetermined frequency.

However, such prior art ultrasonic processors are limited in size and not suitable for use with materials comprising liquid having large solid particles therein such as, for example, a "slurry" or "pulp" of mineral ore mixed with a liquid leaching compound. Thus, prior art ultrasonic processors are unavailable for either high volume processing or for efficient use in extraction of minerals from ores. The essential reason for such unsuitability of prior art devices is their inability to provide large ultrasonic processing chambers. This limitation is a result of the inherent limitations of prior art ultrasonic processors with respect to the manner in which they act upon materials to produce the desired effects.

It is known that the achievement of the desired results by ultrasonic processors is not a gradual process but rather a threshold effect. That is, until a certain power intensity or threshold of ultrasonic oscillations is reached, the desired result is not achieved. The amplitude or intensity at which this effect occurs is called the "threshold level." Increasing the amplitude or intensity of sonic energy substantially above the threshold level does not usually enhance the results to any great degree.

In practice, threshold levels may be fairly easily utilized and achieved in static processors since the cavitation effects, characterized by tremendous differential pressures, can occur within all areas of the material to be processed within two to three inches of the transducer surface in a matter of seconds.

The achievement of threshold effects in continuous flow-through processors is not so easily accomplished in view of the obvious time factor causing the material to be exposed to the ultrasonic oscillations for only a limited period of time (determined by the rate of flow). In continuous flow processing it is necessary to cause the cavitational effects to impinge upon all required sites within the material being processed while insuring that the threshold effect power level is applied to these sites rapidly to enable as high a flow rate as possible.

Certain continuous flow processing apparatus are known in the prior art which minimize this time factor by creating a very small processing volume having a large surface area in contact with the oscillating plates which are separated by an extremely small distance on the order of point 1-25 millimeters. An example of one such prior art device is shown in U.S. Pat. No. 4,071,225, dated Jan. 31, 1978. Such prior art continuous flow processors are obviously less efficient than larger ones and are unsuitable for the processing of large volumes of materials, particularly in the mining or minerals industry where the solid phase particulates exceed the maximum spacing of transducers in these prior art continuous flow processors.

Thus, it is one object of the invention disclosed herein to provide an ultrasonic, continuous flow processor having processing chambers greater in size then prior art processors and where the oscillating plates may, for example, be separated up to the order of magnitude of 120 inches, this spacing being a function of the frequency used in the processor.

Presently, metallic ores are chemically leached to extract the metal therein without the aid of ultrasonic processors. For example, silver and gold ores have been leached with cyanide. However, this process is a function of surface oxidation of the silver and gold. With adequate cleaning of the surfaces of these ores, the productivity of such leaching techniques can be considerably increased. Continual cleaning of the surface as may be effected by ultrasonic processors will produce fresh surface to work with, therefore, an increase in the efficiency of leaching processes will serve to increase ore recoveries and decrease extraction times considerably. Uranium extraction can also be enhanced in this way. Such continual cleaning also enhances dissolution of oxygen in leaching of gold, silver and uranium ores, thus having further beneficial effects as will be apparent to those skilled in the arts. Accordingly, it is a further object of this invention to provide an ultrasonic, continuous flow processor for use in extraction of mineral ores.

Furthermore, prior art ultrasonic processing devices do not incorporate means to vary the frequency, amplitude and/or phase of oscillations produced in oscillating members. While prior art processors such as that disclosed in the aforementioned U.S. Pat. No. 4,071,225 are known to mix frequencies of transducers within one ultrasonic processing device, each transducer used is such device is fixed to oscillate only at one predetermined frequency and with no variation of phase or amplitude among the various transducers. Accordingly, it is another object of this invention to produce means for controlling and effecting frequency, amplitude and/or phase variations in ultrasonic processors.

Heretofore, ultrasonic processor devices have not been capable of optimizing the power drawn into the moving pulp stream in order to better match the operating impedance of the material being processed. This resulted in an inefficient operation of prior art devices. Accordingly, a further object of the invention is to provide means for maximizing an ultrasonic effect within an ultrasonic processor by maximizing power transfer to the material being processed.

SUMMARY OF THE INVENTION

The preferred embodiment of the invention disclosed herein comprises apparatus and process for the ultrasonic treatment of materials. The apparatus comprises a processing chamber having an input thereto and an outlet therefrom for said material to flow therethrough, said chamber being comprised in part of two opposed plates for being oscillated by transducers excited in a predetermined manner by an electronic circuit. The circuit enables the plates to be oscillated at predetermined variable frequencies, with a predetermined relative phase relationship and at predetermined amplitudes. The preferred embodiment further enables the frequency, phase and amplitude of the plates to be varied within a predetermined range.

BRIEF DESCRIPTION OF THE DRAWINGS

A better understanding of the present invention as well as additional objects and advantages thereof will become apparent upon consideration of the detailed disclosure thereof which follows, in conjunction with the following drawings wherein:

FIG. 1 is a side elevational, cross-sectional diagrammatic view of the preferred embodiment of the processing unit and circuitry of the invention;

FIG. 4 is a plan view of the processing unit taken along lines 4—4 of FIG. 2;

FIG. 5 is a plan view of the spacer of the processing unit taken along lines 5—5 of FIG. 2;

FIG. 6 is a schematic circuit diagram of the frequency selector portion of the invention;

FIG. 7 is a schematic circuit diagram of the phase control portion of the invention.

FIG. 8 is a schematic circuit diagram of the power control portion of the invention;

DESCRIPTION OF THE PREFERRED EMBODIMENT

The preferred embodiment of the invention disclosed herein is shown in FIG. 1 as a system and is generally designated by the numeral 10 having a processing unit 12 and an electronic pulse-power drive control unit 14.

Figure 2:
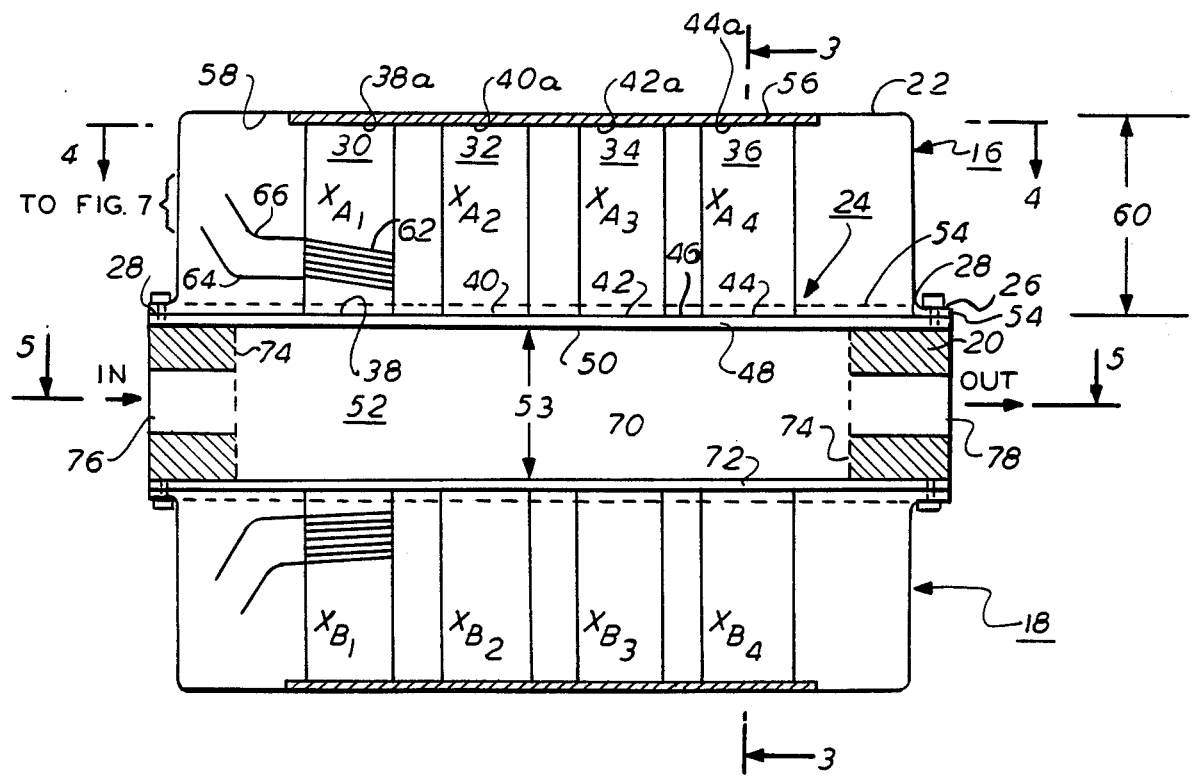
FIG. 2 is a more detailed side elevational, cross-sectional view of the preferred embodiment of the processing unit shown in FIG. 1.

Processing unit 12, more specifically shown in an elevational cross-section view in FIG. 2 comprises a top unit "A" generally designated by numeral 16, a bottom unit "B" generally designated by numeral 18 and a spacer 20 interposed therebetween. Top unit 16 is, in the preferred embodiment, identical to bottom unit 18 and, therefore, only elements within unit 16 will be discussed in detail herein, it being understood that the preferred embodiment incorporates both units 16 and 18.

Figure 3:
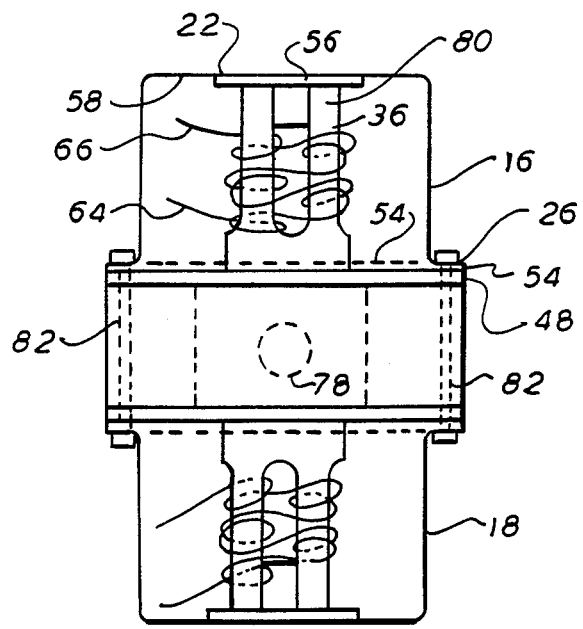
FIG. 3 is front elevational, cross-sectional view of the processing unit taken along the lines 3—3 of FIG. 2.

Unit 16, best seen in FIGS. 2 and 3, includes housing 22 in the form of a rectangular parallelpiped enclosed on 5 sides and open at side 24. Housing 22 may be of a one-piece molded or stamped construction utilizing metal or some other suitable material. Housing 22 is provided with a peripheral flange 26 having a plurality of apertures 28 therein for receiving bolts for securing housing 22 to spacer 20 and unit 18, as will be more fully apparent below.

Housing 22 is for encasing a plurality of transducers (herein designated) 30, 32, 34 and 36 therein. These transducers 30, 32 34 and 36 will sometimes hereinafter be referred to as $X_A$ transducers indicating their position within top unit "A" as opposed to $X_B$ transducers which are those within bottom unit "B". The $X_A$ transducers 30, 32, 34 and 36 are all identical in the preferred embodiment to each other and to the $X_B$ transducer and are more clearly seen in FIGS. 3 and 4. These transducers 30,32,34 and 36 are, in the preferred embodiment, magnetostrictive ferrite transducers which are known in the art to have power output of less than eleven (11) watts per square centimeter of transducer piston area. made from ceramic type material such as barium titanate or lead zirco-titanate and their radiating surfaces are at 38, 40, 42 and 44 respectively. All transducers disclosed herein are driven or caused to oscillate within a predetermined frequency range in a predetermined manner by electronic pulse-power drive-control unit 14 as will be more fully explained below. The frequency range of the preferred embodiment is 1 to 99,900 $H_z$, however, while the frequency is adjustable within this range (as will be explained below), any one set of $X_A$ and $X_B$ transducers may only be frequency variable within a portion of this range (for example, 20 $kH_z$). Thus, the range of frequency variations which may be produced by the preferred embodiment is dependent upon the transducers chosen and if a greatly different frequency is desired the set of $X_A$ and $X_B$ transducers should be installed.

Each radiating surface 38, 40, 42 and 44 is bonded by a suitable bonding material to the back 46 of vibrating plate or diaphragm 18 of unit A (sometimes hereinafter referred to as plate "A"). Those skilled in the art will realize that if a bonding material is used to secure the radiating surfaces of the transducers to back 46 it must be compatible with the material of the $X_A$ transducers and of plate 48 and must be able to transmit the oscillations of each transducers' radiating surface to plate 48 without significant degradation. The plate 48 and the transducer 30, 32 34 and 36 should have similar and compatible coefficients of expansion.

Plate 48 has a working surface 50 which may be of a coating material other than that of plate 48. Surface 50 should be an abrasion and corrosion resistant material capable of withstanding the highly abrasive environment within processing chamber 52 to which it (surface 50) will be subjected, such as non-magnetic stainless steel, nickel, titanium, tantalum or aluminum oxide. Plate 48 is the same size as flange 26 and is provided with apertures in alignment with apertures 28. A spacer 54 is interposed between flange 26 and the back 46 of plate 48 in order to insulate housing 22 from the oscillations of plate 48.

The ends of all $X_A$ transducers 38a, 40a, 42a and 44a opposite radiating surfaces 38, 40, 42 and 44 respectively, are bonded to a backing plate 56 which is, in operation, abutted against the inside surface 58 of housing 22. Consequently, those skilled in the art will realize plate 56 must be of a vibration insulating material so as to avoid needless and inefficient transfer of energy to housing 22 and away from working surface 50. The depth 60 of housing 22 is equal to the combination of the thickness of plate 56 and the length of an $X_A$ transducer in order to effect a tight fit between all components when unit 16 is assembled.

Those skilled in the art will realize that the apparatus disclosed herein will function properly without housing 22 and backing plate 56. If the transducers are brazed or otherwise suitably bonded to the oscillating plates then there is no need for the housing and plate.

Each $X_A$ transducer is wound with a predetermined number of coils of suitable teflon coated wire 62 as shown schematically on transducer 30 in FIGS. 2 and 4 and transducer 36 in FIG. 3. Those skilled in the art will understand that the impedance of each transducer coil should be matched with the impedance of its driving circuit for efficient power transfer. (The windings are not shown on transducers 32, 34 and 36 in order to clarify the the drawing.) All transducers are wound in parallel and each pair of ends 64 and 66 are connected to respective drive circuits as will be more apparent below with respect to FIG. 9. Wire 62 has end leads 64 and 66 which terminate at a point (not shown) external to housing 22. The means by which leads 64 and 66 pass through housing 22 is purely conventional and is not shown herein.

Processing unit 12 includes a processing chamber 52 formed by surface 50, the working surface 70 of the oscillating plate 72 of unit 18, and the interior surface 74 of spacer 20. The shape of processing chamber 52 is more clearly seen in FIG. 5 which shows a plan view of spacer 20 including input port 76 and outlet port 78. Ports 76 and 78 may be threaded to be compatible with pipes (not shown) for feeding unprocessed material into chamber 52 and receiving processed material therefrom after it has been subjected to ultrasonic oscillations within chamber 52. Spacer 20 should be a material which will not absorb the ultrasonic energy within processing chamber 52. It should also be resistant to abrasion as well as chemically inert. For example, spacer 20 may be constructed from a non-metallic material, plastic or elastomer.

The depth 53 of processing chamber 52 is obviously equal to the height of spacer 20. In operation of the preferred embodiment, spacer 20 may be either a single unit having the desired height or may comprise several layers of spacers having predetermined thicknesses which may be combined to produce the desired height. This height, and therefore depth 53, is a function of the power and frequency at which the transducers will be operated. Depth 53 may, for example vary from the order of 1 inch at 20 $KH_z$ to the order of 120 inches at 5 $KH_z$. The greater the depth, the greater the power that must be applied to the oscillating plates.

FIG. 3 discloses a side elevational cross-section view of FIG. 2 taken along lines 3—3. FIG. 3 more clearly shows $X_A$ transducer 36 and biasing magnet 80 associated therewith in a manner well known to those skilled in the art for producing a necessary bias to enable full and efficient utilization of magnetostrictive transducers. The biasing magnets shown need not be utilized if an electrical DC bias is applied to the transducers. Bolts 82 are also schematically shown in FIG. 3 indicating the means by which the various component elements of processing unit 12 are joined.

FIG. 4 is a plan cross-section view of FIG. 2 taken along line 4—4 and shows the shape of processing chamber 52, apertures 28, backing plate 56 and $X_A$ transducers 30, 32, 34 and 36. Wire 62 and end leads 64 and 66 are diagrammatically shown wrapped around the N and S poles of transducer 30 in a pattern well known to those skilled in the art.

Figure 9:
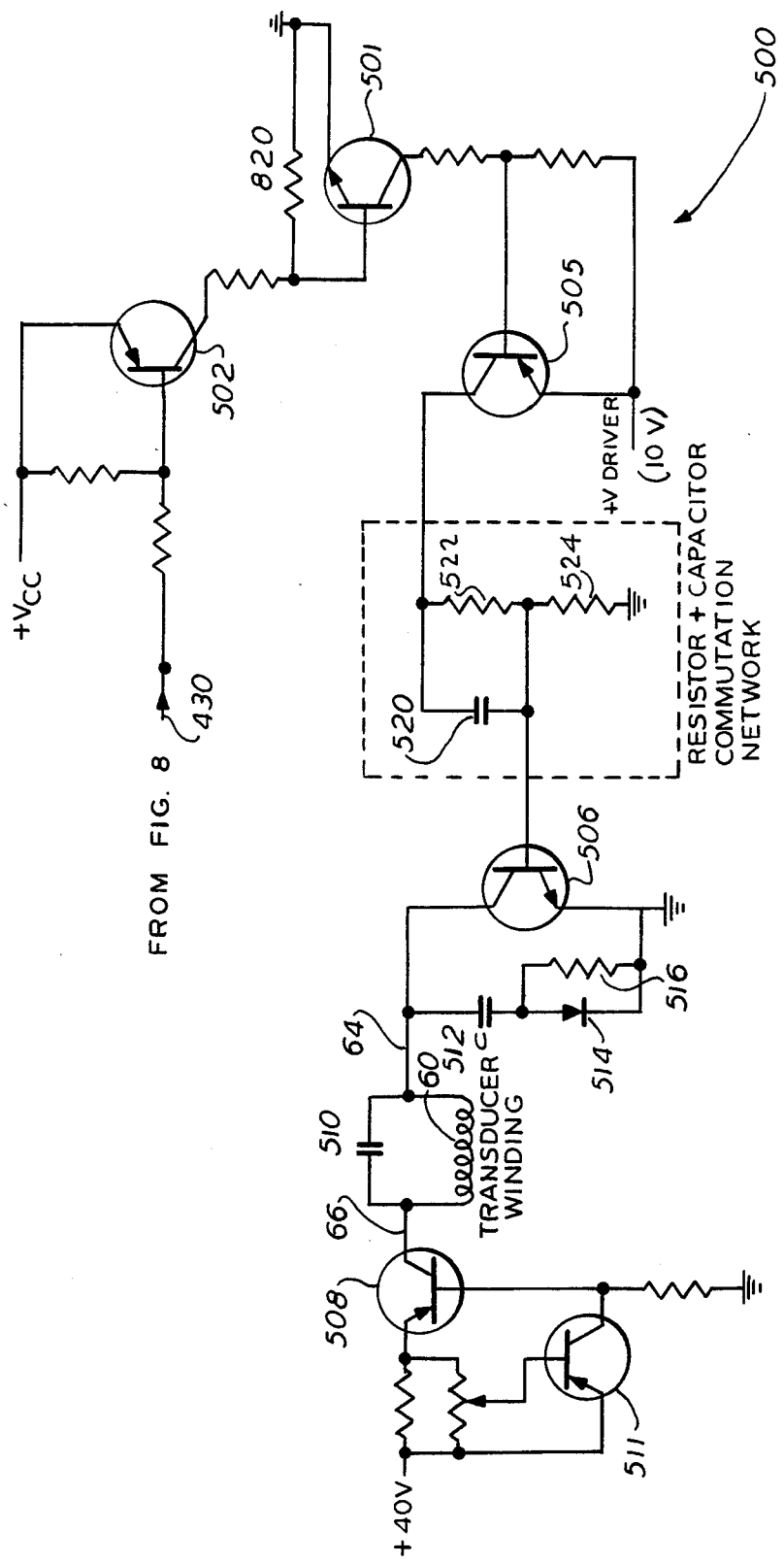
FIG. 9 is a schematic circuit diagram of the power drives portion of the invention.
Figure 10:
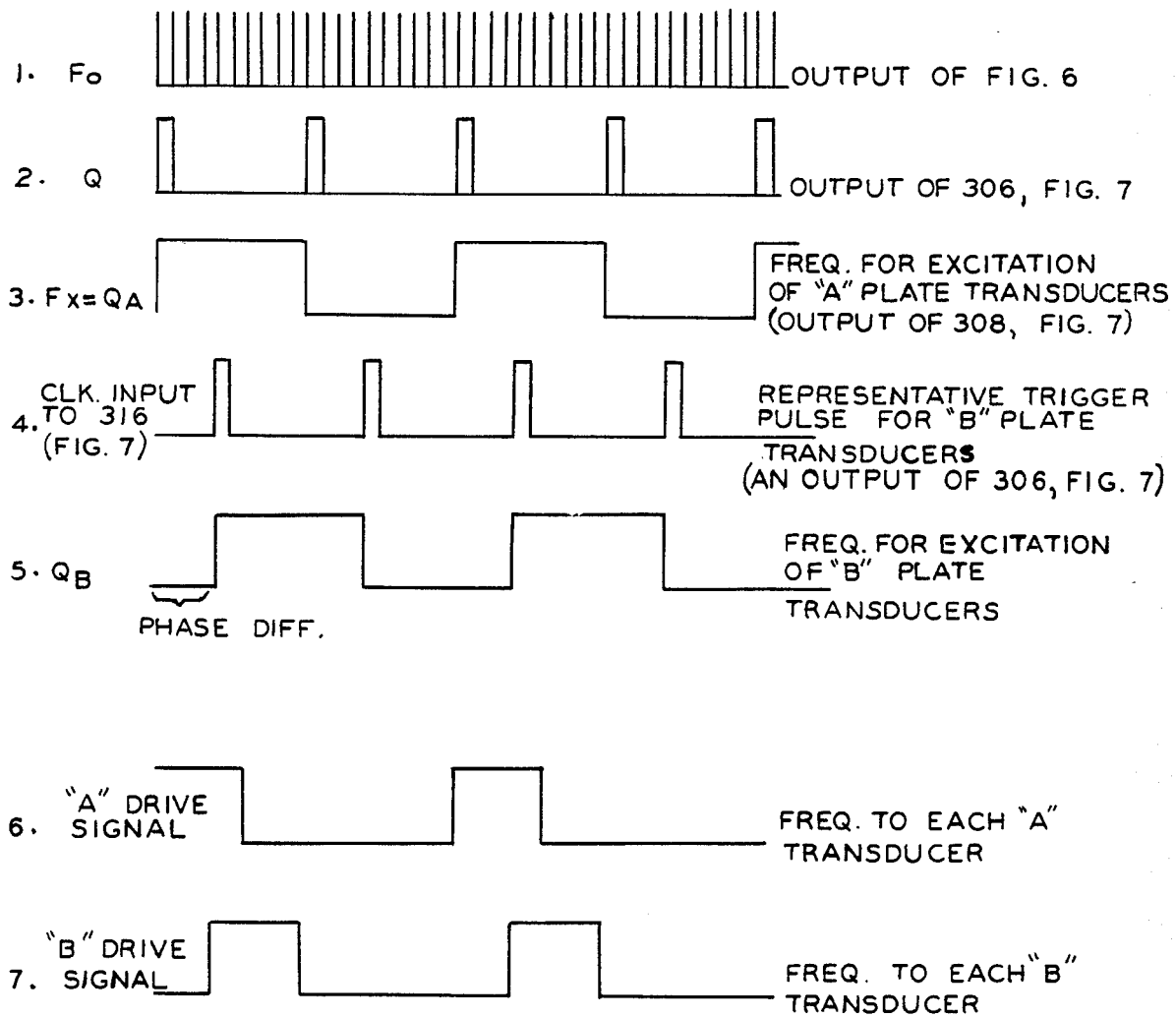
FIG. 10 is a schematic timing diagram showing various representative signals produced by the invention.

Referring now to FIGS. 1 and 6 through 10, the operation of electrical pulse-power drive control 14 will be explained. As seen in FIG. 1, control 14 consists essentially of a frequency selector circuit 100, phase control circuit 102, power control circuit 104 and power driver circuite 106. Each of these circuits is more specifically described in FIGS. 6, 7, 8 and 9 respectively. FIG. 10 shows timing diagrams linking various circuit operations.

Referring now to FIG. 6, there is shown a schematic representation of frequency selector circuit 100 including 2000 $MH_z$ oscillator 200, binary coded decimal (BCD) rate multiplier network 202, BCD switches 204, 205, 206, 207 and 208 and LED display section 210.

Oscillator 200 produces digital pulses at its output along line 212 to the rate multiplier network 202. Oscillator 200 may be of conventional construction, however, the design of oscillator 200 in the preferred embodiment employs an integrated circuit (for example, a 4001 Quad NOR Gate) wired as shown in FIG. 6.

Rate multiplier network 202 comprises five cascaded integrated circuit chips 214, 216, 218, 220 and 222, each a 4527 BCD Rate Multiplier, all wired as shown in FIG. 6. Rate multipliers 214, 216, 218, 220 and 222 are each controlled respectively by BCD switches 204, 205, 206, 207 and 208. These BCD switches may, for example, be thumbwheel-type adjustable switches providing a BCD output from each switch as a function of the setting thereon. Switches 204, 205, 206, 207 and 208 are also respectively wired as shown with LED drivers 224, 226, 228, 230 and 232 which are themselves respectively wired to drive LED chips 234, 236, 238, 240 and 242. The wiring of the various components of FIG. 6 is conventional and is therefore not discussed in detail herein.

Switches 204, 205, 206, 207 and 208 simultaneously provide a signal to their respective rate multiplier and LED driver and, therefore, the output displays by LED display 210 is related to the output of rate multiplier network 202. As will be more fully explained below, the LED display section 210 will display, on chips 234, 236, 238, 240 and 242, the frequency $F_X$ ultimately provided to both $X_A$ and $X_B$ transducers. Simultaneously with this display, the output of the rate multiplier network 202 is herein designated $F_0$ on line 250 where, because of the cascaded design of network 202, $F_0 = 20 F_X$. The necessity for providing a signal in the preferred embodiment at a multiple of $F_X$ is related to the ability of the apparatus disclosed herein to provide differential phase oscillations between $X_A$ and $X_B$ transducers, as will be more fully explained below.

Referring now to FIG. 7, there is shown in more detail a schematic diagram of phase control unit 102.

Phase control unit 102 comprises phase A circuit 300, a phase B circuit 302 and a phase display circuit 304.

Phase A circuit 300 is essentially a divide by 20 counter comprising an integrated circuit decoded output decimal counter 306 (for example a 4017 Decimal Counter) to divide the $F_0$ input from frequency selector 100 by ten, and a divide by 2 flip flop 308 (for example, a 4013 Dual D Flip Flop). Those skilled in the art will understand that the output $Q_A$ of phase A circuit 300, on line 310, is a digital series of pulses having the same frequency as that displayed on LED display 210 of FIG. 6.

Counter 306 is wired as shown in FIG. 7, its output lines 0–9 being connected respectively to contacts on rotary switch 312-1. The tenth pulse going through counter 306 (i.e. the pulse at terminal number 9) is used as a clock pulse to trigger flip flop 308, thus producing alternately high and low output pulses $Q_A$ having a duration of ten $F_0$ pulses and a frequency $F_0 \div 20 = F_X$ (best seen on Line 3 FIG. 10)

Figure 11A:
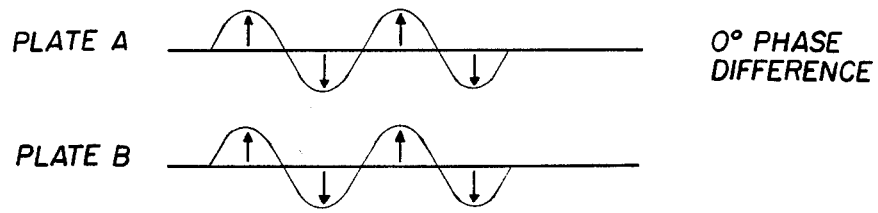
FIG. 11(a) is a schematic wave diagram showing the relative positions of the opposing oscillating plates of the transducers at 0° phase difference.
Figure 11B:
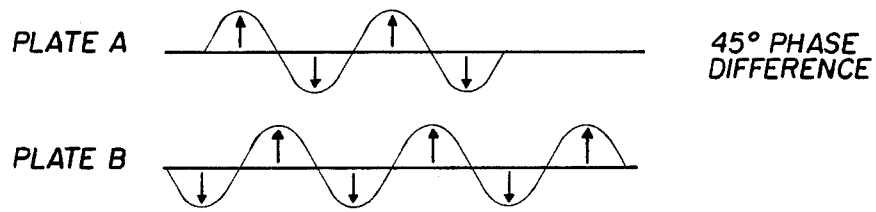
FIG. 11(b) is a schematic wave diagram showing the relative positions of the opposing oscillating plates of the transducers at 45° phase difference.
Figure 11C:
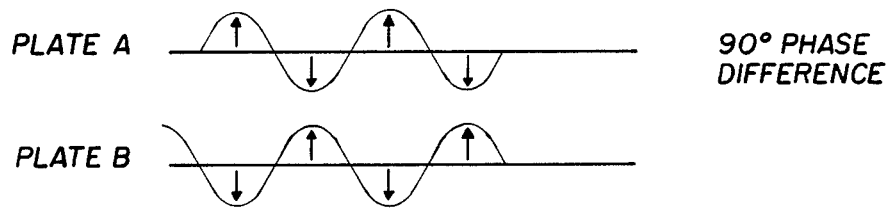
FIG. 11(c) is a schematic wave diagram showing the relative positions of the opposing oscillating plates of the transducers at 90° phase difference.

Referring now to FIG. 11, the terms "phase difference", "phase relative to" and "phase relationship" are most easily understood by examining FIGS. 11(a,b,c). As shown in FIG. 11(a) the transducer plates are both moving in the same direction in real time at 0° phase difference. Conversely, as shown in FIG. 11(c) both plates are moving in opposite directions when the phase difference is 90°. As illustrated in FIG. 11(b) when the phase difference is 45° the plates are moving in different directions during one half of the cycle and in the same direction during one half of the cycle.

Switch 312-1 is one plate of an 11 position ganged switch generally designated 312, with the remaining plates thereof being designated 312-2 and 312-3 as shown. The terminals of each plate of the ganged switch 312 are designated in increments of 9° going from 0° to 90° to represent a variable phase difference between the A and B sets of signals selectable within the range 0° to 90°.

The output of counter 306 and $Q_A$ are utilized by phase B circuit 302 to produce an output signal $Q_B$ having the same frequency as $Q_A$ but of different phase. The output signal $Q_A$ goes through a one-shot multivibrator 314 which produces an output pulse to reset flip flop 316 (for example, a 4013 Dual D Flip Flop) while the output of counter 306 is selectively (by means of switch 312-1) applied to the clock input of flip flop 316. As will be understood by those skilled in the art, the result is that the output $Q_B$ of flip flop 316 is shifted in time from $Q_A$ as more clearly seen in lines 3, 4 and 5 of the timing diagram FIG. 10.

The output $Q_B$ of flip flow 316 is wired to switch 312-2 having contacts 2–11 (designated by numerals 9–90 representing degrees) thereof shorted while contact 1 is connected to $Q_A$ via line 318. Consequently, when switch 312-2 is in position 1 (marked 0°) the output of phase B circuit 302 on line 320 is $Q_A$ and both $X_A$ and $X_B$ transducers will be oscillating in phase, i.e. phase difference $=0°$ and the plates consequently move simultaneously in the opposite directions at each instant of time. A phase difference of 90° is representative of a relative movement of the two plates in the same direction at each instant of time. The greatest effects of cavitation disruption and the maximum power transfer to the medium being processed have been observed to fall between 30° to 60°. When switch 312-2 is in any other position, its output is dictated by the output of flip flop 316 which is a function of the position of switch 312-1.

Those skilled in the art will understand that the phase difference between $Q_A$ and $Q_B$ can be stepped from 0° to 90° in 9° increments.

A visual display of the phase difference between $Q_A$ and $Q_B$ is provided by phase display 304. Switch 312-3, ganged to switches 312-1 and 312-2, enables certain combinations of inputs of LED drivers 330 and 332 (each, for example, a 4511 BCD to 7 segment latch, decoder/driver), in turn causing LED chips 334 (tens) and 336 (units) to fire respectively and display that number corresponding to the pre-wired combinations necessary to reflect phase difference increments from 0° to 90° in 9° increments. The detailed wiring to effect such results is conventional and therefore not discussed herein.

The present invention utilizes phase relationships between the oscillating plates to achieve doppler and other ultrasonic effects similar to those occurring in prior art ultrasonic processors having extremely thin processing chambers. However, the present invention neither requires nor depends upon reflections of ultrasonic oscillations from surfaces opposite the oscillating source. The phase difference between the oscillating plates therefore eliminates the necessity for reflections in prior art processors and enables much larger (deeper) processing chambers. The depth of the chambers which are made possible by the present invention depends upon the power and frequency of the signals applied to the transducers—lower frequencies generally enables deeper chambers, all other parameters being equal.

The phase difference between the oscillating plates effectively produces a plurality of frequencies similar to the result obtained due to doppler effects in thin-chambered prior art ultrasonic processors. The phase difference increases the number of rarefactions and compressions set up within the medium being processed and thus tends to remove standing waves, thus improving and increasing the ultrasonic energy gradient within the processing chamber. The power or energy transferred to the processing chamber may be sensed by a conventional power meter (not shown). As stated above, the maximum power transfer appears to occur between 30° and 60° phase difference. This power transfer may be further enhanced by operation under increased pressure.

The outputs $Q_A$ and $Q_B$, each a digital series of pulses having a frequency $=F_X$, are applied to power control unit 104, more specifically shown in FIG. 8, which effects power control of the pulses applied to the transducers through pulse width modulation. Unit 104 is divided into two identical sections: $X_A$ transducer power section 402 and $X_B$ transducer power circuit 404 for producing power control signals for the $X_A$ and $X_B$ group of transducers respectively. In view of the identity between sections 402 and 404, only the former will be described in detail herein. It will be understood that the circuits disclosed herein may, if desired, be employed to vary the duty cycle of each single transducer in an ultrasonic processor rather than groups of transducers.

Section 402 comprises counter 406 (for example, a 4017 Decimal Counter) which receives an $F_0$ clock input at its clock terminal from line 250 via line 408. Counter 406 also receives at its clock enable terminal the $Q_A$ output of phase control unit 102 through an inverter 410. The $Q_A$ signal is also provided to one-shot multivibrator 412, the output of which sets flip flop 414 (for example, a 4013 Dual D Flip Flop) when $Q_A$ goes high. The decoded outputs of counter 406 occur at each of the ten pulses after the clock enable pulse (since $Q_A$ remains high for ten $F_0$ pulses) and go through an 11 position rotary switch 416-1 (not shown), through inverter 418 and one-shot multivibrator 420, the output of which is provided to the reset terminal of flip flop 414. Switch 416-2 (not shown), ganged to switch 416-1, receives the Q output of flip flop 414 and connects it in parallel to buffer amplifiers 420, 422, 424 and 426 which ultimately, as will be shown below, provide power control signals for $X_A$ transducers 30, 32, 34 and 36, respectively.

The clock input frequency to counter 406 is $F_0 = 20 F_X$ and thus during the time $Q_A$ is high at the clock enable terminal of counter 406, the ten outputs of the counter will range in 5% increments from zero and 5% (at the output terminal marked 10) to 50% (at the output terminal marked 100). The numbers applied to the output terminals are arbitrary and merely indicative of a "full-scale" (i.e. 50% on time) duty cycle being equal to 100.

When $Q_A$ goes high it triggers a one-shot multivibrator 412 which sets flip-flop 414 causing its Q output to go high. The Q output is made low when flip-flop 414 is reset by one-shot 420 which fires in response to a selected output of counter 406. Thus, the Q output of flip-flop 414 may have a duration from zero to whatever duration $Q_A$ has (which in the preferred embodiment is a maximum of 50% on-time since $Q_A$ remains high for 10 Clock pulses and low for 10 clock pulses).

Those skilled in the art will understand that the circuit of section 402 provides output signals (to the transducers on lines 430, 432, 434 and 436) which have selectively variable duty cycles depending upon the position of switch 416-1. For example, when switch 416-1 is set at the position marked 60 the reset signal is applied to flip-flop 414 on the sixth clock pulse after the clock enable pulse. This results in the Q output of flip-flop 414 staying high for 6 pulses out of the ten pulse duration of $Q_A$, thus providing drive signal to the $X_A$ transducers having a duty cycle of 60% as schematically shown on line 7 of FIG. 10. The output of line 430 (connected to $X_A$ transducer 30) in relationship to the output of corresponding line 440 (connected to one of the $X_B$ transducers) is shown more clearly on lines 7 and 8 of timing diagram FIG. 10. While these output signals are represented as having a 60% duty cycle, it is clear that a phase difference exists between the two sets of signals. (Note that FIG. 10 does not necessarily represent the proper polarity of the various signals and is intended to be merely representative of timing and phase variations).

The preferred embodiment of the invention utilizes means for enabling the apparatus disclosed herein to have difficult duty cycles applied to the oscillating plates. Thus, plate 48 transducers may be excited by a 50% duty cycle while plate 72 transducers may simultaneously be excited by a 30% duty cycle. The advantages offered by such flexibility are significant. It has been found, for example, that the mere difference in duty cycles applied to plates 48 and 72 (all other parameters being the same) can produce different effects upon the material in the processing chamber. Thus, one set of duty cycles (e.g. 50% on plate 48 and 30% on plate 72) may produce a stable emulsion (if the apparatus is used for emulsification) while a different set of duty cycles may produce an unstable emulsion.

Referring now to FIG. 9 showing a power driver circuit 500, the further processing of the output signal on line 430 is explained.

Power driver circuit 500 is one of several identical power driver circuits in power driver unit 106 shown in FIG. 1. Each transducer utilized in the preferred embodiment has one such power driver circuit 500 associated therewith. For clarity, therefore, only one such circuit is shown in FIG. 9 and is more specifically described herein.

The output of line 430 of FIG. 8 is associated with the number of transducer 30 in the A section 16. The signal on line 430, more clearly seen on line 7 of timing diagram FIG. 10, is amplified in the circuit shown in FIG. 9 to provide pulse power to transducer winding 60 through leads 64 and 66 (corresponding to numerical designations on FIG. 2) at a frequency equal to that shown on frequency display 210. The pulsing of the transducers enables a greater power input because of the absence of a temperature rise in the transducers and because of the short drive time. Any requisite cooling of the transducers is also effected by the slurry or material being processed.

FIG. 9 shows a cascaded transistor array comprising transistors 501, 502 and 505 which turn on high speed output drive transistor 506 when the output signal on line 430 is low. The result is excitation of the associated transducer in a manner well known to those skilled in the art.

Transistors 508 and 511 function as a current clamp to limit the maximum current in the transducer windings to prevent saturation. Capacitor 510 is placed across the transducer windings to improve the power factor. Each output transistor 506 has associated therewith a "snubber" network comprising capacitor 512, diode 514 and resistor 516 to extend the safe operating area of transistor 506. Transistor 505 has associated therewith, as shown, capacitor 520 and resistors 522 and 524 to form a resistor and capacitor commutation network. Other resistors shown in FIG. 9 are not enumerated herein since their function and relationship to the circuit will be understood by those skilled in the art.

Power transfer from the plates to the material in the processing chamber is affected by the impedance of the material, which impedance varies as a function of flow rate, particulate size, pressure, etc. Power meters (not shown) may be secured to plates 48 and 72 in order to provide the user with an indication of power being transferred to the material being processed. A user could then adjust input power appropriately to enable optimizations of this power transfer even in a dynamic situation when material is flowing in the chamber. A microprocessor (not shown) may be employed in functional interconnection with such a power meter or other sensors to act as a feedback controller to vary the different parameters of the invention in order to continuously maintain optimum power transfer to the material.

Those skilled in the art will understand that there is a relationship between the power input to the $X_A$ and $X_B$ transducers and the amplitude of oscillation of each plate 48 and 72. This relationship need not be linear in order to achieve proper operation of the preferred embodiment disclosed herein.

Numerous uses of this invention are possible in order to enhance ultrasonic processing of various materials, mixtures, substances and the like. This invention may be used for all known ultrasonic processing operations at levels of efficiency considerably greater than those of prior art ultrasonic processes.

Also, depending on the work operation to be performed, numerous other embodiments of the invention may be used. For example, consider the problem presented by a mineral ore coated with silica and iron oxide, and from which one wishes to extract the underlying metal such as gold, silver and the like. The separation of silica, the heavy fraction, from the ore by ultrasonic processing requires a relatively low frequency and high power level. The separation of the light fraction, iron oxide, may then require a relatively higher frequency and lower power. Thus, this is an example of a work operation requiring a sequential exposure of a material to a gradient of frequency and power. The invention disclosed herein may accomplish such a gradient of frequencies and powers and also of phase by being structured in a sequential format. That is, a plurality of processing chambers could be arranged in series so that the output from one would flow into the input of the next, and so on. The transducers associated with each processing chamber could be controlled in parallel from an electronic control unit which could, in accordance with the principles disclosed herein, control the frequency, power and amplitude signals supplied to the sequentially arranged groups of transducers. Possibly different transducers having different resonant frequencies may be necessary in conjunction with the successive processing chambers, depending upon the frequencies to which the material must be exposed. In this manner, the flowing material could be exposed to predetermined frequency and power gradients by operation of the first processing chamber at one set of frequencies and power levels, the next processing chamber at a higher (or lower) frequency and lower (or higher) power level, and so on. Thus, the mineral ore could be completely processed in one pass through the sequentially arranged processing chambers.

Throughout this description of the invention it will be understood by those skilled in the art that the term "power" may be used variously to describe either the power input to the plates or the power intensity to which the material in the processing chamber is exposed. The power intensity is a function of the total power input, the area size of the vibrating plates over which the power is dispersed, as well as the frequency and phase of the oscillations.

Those skilled in the art will understand that numerous other modifications and changes of the embodiments of the invention disclosed herein may be made without departing from the spirit and scope thereof.

What is claimed is:

1. An apparatus for treating material with waves having an ultrasonic frequency having a minimum frequency of at least one thousand (1,000) cycles per second (c.p.s.) and a power intensity of less than forty (40) watts per square centimeter, comprising:
    a processing chamber for said material to be treated therein;
    two opposed plates in contact with said material in said chamber, said plates being for oscillation at an ultrasonic frequency and said plates being disposed substantially parallel to each other;
    means functionally connected to each of said opposed plates for causing each of said opposed plates to oscillate at said frequency;
    means functionally connected to each to said opposed plates for varying the relative phase relationship between each of said opposed paltes; and
    means functionally connected to each of said opposed plates for causing each of said opposed plates to oscillate at an amplitude.

2. An apparatus according to claim 1 wherein said opposed plates form two surfaces to said processing chamber.

3. An apparatus for treating material flowing therethrough with waves having an ultrasonic frequency having a minimum frequency of at least one thousand (1,000) cycles per second (c.p.s.) and a power intensity of less than forty (40) watts per square centimeter, comprising:
    a first and second parallel plate having the front surfaces thereof facing each other and spaced at a distance for forming two sides of a processing chamber;
    a spacer interposed between said parallel plates for forming the other, peripheral sides of said processing chamber, said spacer having an input aperture for enabling said flowing material to flow into said processing chamber and an outlet aperture for enabling said flowing material to flow out of said processing chamber;
    at least one first transducer secured to the back surface of said first plate and for producing oscillations thereof;
    at least one second transducer secured to the back surface of said second plate and for producing oscillations thereof;
    means functionally connected to and for causing each of said first and second transducers to oscillate at an ultrasonic frequency;
    means functionally connected to each of said first and second transducers for varying the relative phase relationship between said first and second transducer;
    means functionally connected to and for causing each of said first and second transducers to oscillate at an amplitude;
    whereupon causing said material to flow through said processing chamber while causing said first and second transducers to oscillate at said phase, amplitude and ultrasonic frequency, said plates will oscillate thereby creating oscillations within said material in said processing chamber thereby treating said material.

4. An apparatus according to claim 3 wherein said input and outlet apertures are substantially linearly aligned.

5. An apparatus according to claim 4 wherein said plates are symmetrically disposed about the alignment axis of said input and output apertures.

6. An apparatus according to claim 5 wherein said amplitude of oscillation of each of said plates is selectable within a range of amplitudes while said material is flowing through said processing chamber.

7. An apparatus according to claim 5 wherein said relative phase relationship between the oscillations of each of said plates is selectable within a range of relative phase relationships while said material is flowing through said processing chamber.

8. An apparatus according to claim 5 wherein said ultrasonic frequency of oscillations of each of said plates is selectable within range of frequencies while said material is flowing through said processing chamber.

9. An apparatus for treating material flowing therethrough with waves of an ultrasonic frequency having a minimum frequency of at least one thousand (1,000) cycles per second (c.p.s.) and a power intensity of less than forty watts per square centimeter, comprising:
- a processing chamber having an input thereto and an outlet therefrom for said material to flow therethrough and to be treated therein;
- two opposed rectilinear plates in contact with said material in said chamber, said plates being for oscillation and said plates being disposed substantially parallel to each other, said plates forming two surfaces of said processing chamber and the front surfaces of said plates facing each other;
- a first plurality of magnetostrictive transducers having their radiating surfaces secured to the backs of one of said opposed plates;
- a second plurality of magnetostrictive transducers having their radiating surfaces secured to the backs of the other of said plates;
- oscillating means for producing first signals having a frequency selectable within a range of ultrasonic frequencies;
- phase means functionally connected with said oscillating means and responsive to the frequency output thereof for producing at least two first output signals having variable relative phase relationships therebetween;
- power signal means functionally interconnected with said oscillating means, and responsive to the frequency output thereof, and functionally interconnected with said phase means, and responsive to said first output signals thereof, for producing a first and second set of power signals, said first set of power signals corresponding to one of said first output signals and said second set of power signals corresponding to the other of said first output signals, said first set of power signals corresponding in number to said first plurality of transducers and said second set of power signals corresponding in number to said second plurality of transducers, each one of said first set of power signals corresponding respectively to one of said first plurality of transducers, each one of said second set of power signals corresponding respectively to one of said second plurality of transducers, said power signal means for controlling the magnitude of power within said first and second sets of power signals;
- a first set of driving means corresponding in number to said first plurality of transducers and functionally interconnected with said first set of power signals and said first plurality of transducers, each of said first set of driving means respectively responsive to said first set of power signals for driving respectively said first plurality of transducers;
- a second set of driving means corresponding in number to said second plurality of transducers and functionally interconnected with said second set of power signals and said second plurality of transducers, each of said second set of driving means respectively responsive to said second set of power signals for driving respectively said second plurality of transducers.

10. An apparatus according to claims 1, 3 or 9, having means for varying the pressure in said processing chamber.

11. An apparatus according to claim 9 wherein said input and outlet are substantially linearly aligned.

12. An apparatus according to claim 9 wherein said power signal means includes means for selecting the duty cycle of said first set of power signals within a range of duty cycles and for selecting the duty cycle of said second set of power signals within said range of duty cycles.

13. An apparatus for treating material flowing therthrough with waves having an ultrasonic frequency having a minimum frequency of at least one thousand (1,000) cycles per second (c.p.s.) and a power intensity of less than forty (40) watts per square centimeter, comprising:
- a processing chamber having an input thereto and an outlet therefrom for said material to flow therethrough and to be treated therein;
- two opposed plates for being in contact with said material in said chamber, said plates being for oscillation and said plates being disposed substantially parallel to each other; and
- means for causing each of said opposed plates to oscillate at said ultrasonic frequency; the improvement comprising:
- means for varying the relative phase relationship between said opposed plates.

14. An apparatus for treating material flowing therethrough with waves having an ultrasonic frequency having a minimum frequency of at least one thousand (1,000) cycles per second (c.p.s.) and a power intensity of less than forty (40) watts per square centimeter, comprising:
- a plurality of serially connected processing chambers, each one having an input thereto and an outlet therefrom for said material to flow therethrough and to be treated therein, the output of one processing chamber connected to the input of the next successive processing chamber;
- a plurality of sets of two opposed, substantially parallel plates, said plurality of sets being equal in number to said plurality of processing chambers, each set being within one respective processing chamber, each of said opposed plates being in contact with said material within their respectively associated processing chambers, said opposed plates within each of said sets for being vibrated at an ultrasonic frequency;
- means functionally connected to each of said opposed plates for causing each of said plates within each of said sets to oscillate at said ultrasonic frequency;
- phase means functionally connected to each of said opposed plates for varying the phase relationship between said opposed plates within each of said sets; and
- means functionally connected to each of said opposed plates for causing each of said plates to oscillate at an amplitude of oscillation.

15. An apparatus according to claim 14 wherein said frequency means comprises:
- means for causing each plate of each of said sets of plates to oscillate at a frequency which varies among said sets and from one of said sets to the next successive one of said sets for producing a gradient of frequencies among said pluralities of said sets of plates.

16. An apparatus according to claim 15 wherein said phase means comprises:
   means for causing one of said plates of each of said sets of plates to oscillate at a phase relative to the other corresponding plate of each of said sets such that the phase difference between the plates of the next successive one of said sets produces a gradient of phase differences among said plurality of sets of plates.

17. An apparatus according to claim 16 wherein said amplitude means comprises:
   means for causing each plate of each of said sets of plates to oscillate with an amplitude of oscillation which varies among said sets and from one of said sets to the next successive one of said sets for producing a gradient of amplitudes of oscillations among said plurality of sets of plates.

* * * * *